US 10,343,585 B2

(12) United States Patent
Ballu

(10) Patent No.: US 10,343,585 B2
(45) Date of Patent: *Jul. 9, 2019

(54) AGRICULTURAL SPRAYING MACHINE AND METHOD FOR SPRAYING A PHYTOSANITARY LIQUID ON LAND CULTIVATED BY MEANS OF SUCH A MACHINE

(71) Applicant: EXEL INDUSTRIES, Epernay (FR)

(72) Inventor: Patrick Ballu, Reims (FR)

(73) Assignee: EXEL INDUSTRIES, Epernay (FR)

( * ) Notice: Subject to any disclaimer, the term of this patent is extended or adjusted under 35 U.S.C. 154(b) by 86 days.

This patent is subject to a terminal disclaimer.

(21) Appl. No.: 15/402,588

(22) Filed: Jan. 10, 2017

(65) Prior Publication Data

US 2017/0142957 A1   May 25, 2017

Related U.S. Application Data

(63) Continuation of application No. 13/824,878, filed as application No. PCT/FR2011/052295 on Oct. 3, 2011, now Pat. No. 9,707,882.

(30) Foreign Application Priority Data

Oct. 5, 2010   (FR) ...................................... 10 58073

(51) Int. Cl.
*A01M 7/00* (2006.01)
*B60P 3/30* (2006.01)
(Continued)

(52) U.S. Cl.
CPC ............. *B60P 3/30* (2013.01); *A01M 7/0057* (2013.01); *A01M 7/0089* (2013.01);
(Continued)

(58) Field of Classification Search
CPC ..... A01C 23/047; A01C 23/008; A01C 15/00; B60P 3/30; B60Y 2200/22; A01M 7/0089;
(Continued)

(56) References Cited

U.S. PATENT DOCUMENTS 4,427,154 A * 1/1984 Mercil ....................... B05B 3/18
239/161
4,561,591 A 12/1985 Ballu
(Continued)

FOREIGN PATENT DOCUMENTS

DE          41 40 254 A1    6/1993
EP          1 444 894 A1    8/2004
(Continued)

*Primary Examiner* — Arthur O. Hall
*Assistant Examiner* — Tuongminh N Pham
(74) *Attorney, Agent, or Firm* — Arent Fox LLP

(57) ABSTRACT

The invention relates to an agricultural machine for spraying a phytosanitary liquid over cultivated land, said machine comprising means for moving the machine, a spray boom having at least one arm, a mechanism for inclining the boom and/or at least one of the arms in relation to a frame of the machine and vertically when the machine is on a flat and horizontal surface, and a mechanism for raising/lowering the boom along an axis fixed in relation to the frame of the machine. At least one of the arms is provided with at least one sensor, each sensor measuring a distance between the surface of the land and said sensor or, if necessary, between the crop and the sensor. The control unit is connected to each sensor, provided with a memory for storing information provided by each sensor, and able to control the raising/lowering mechanism according to information stored in the memory.

18 Claims, 2 Drawing Sheets

(51) Int. Cl.
 B05B 12/12 (2006.01)
 B05B 13/00 (2006.01)
(52) U.S. Cl.
 CPC .......... B05B 12/124 (2013.01); B05B 13/005 (2013.01); B60Y 2200/22 (2013.01)
(58) Field of Classification Search
 CPC . A01M 7/0057; G05B 19/0425; G01C 19/00; B05B 12/124; B05B 13/005
 USPC ..... 239/67, 69, 73, 159–169, 726, 722–723; 701/49, 50
 See application file for complete search history.

(56) References Cited

U.S. PATENT DOCUMENTS

| | | | | |
|---|---|---|---|---|
| 5,348,226 A | * | 9/1994 | Heiniger | A01M 7/0057 239/1 |
| 2004/0158381 A1 | | 8/2004 | Strelioff et al. | |
| 2011/0153168 A1 | * | 6/2011 | Peterson | A01B 79/005 701/50 |
| 2011/0266365 A1 | * | 11/2011 | Hrnicek | A01B 79/005 239/164 |
| 2011/0282554 A1 | * | 11/2011 | Keye | A01M 7/0057 701/49 |

FOREIGN PATENT DOCUMENTS

| | | |
|---|---|---|
| UA | 50466 A | 10/2002 |
| UA | 56465 A | 5/2003 |
| UA | 90696 A | 5/2010 |
| WO | WO 2011/073751 A2 | 6/2011 |

\* cited by examiner

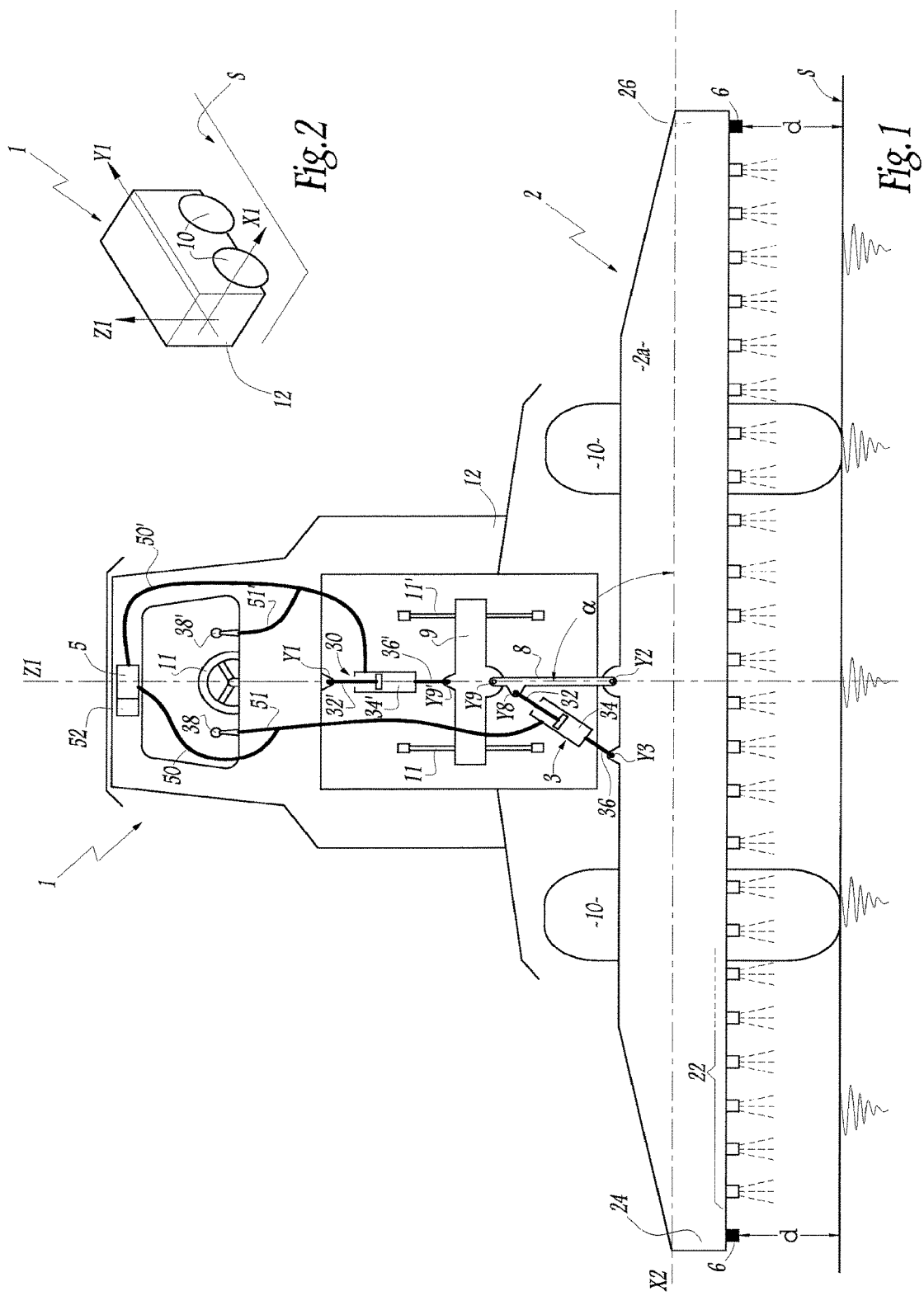

AGRICULTURAL SPRAYING MACHINE AND METHOD FOR SPRAYING A PHYTOSANITARY LIQUID ON LAND CULTIVATED BY MEANS OF SUCH A MACHINE

CROSS-REFERENCE TO RELATED APPLICATIONS

This application is a Continuation of U.S. patent application Ser. No. 13/824,878, filed Jul. 22, 2013, which is a National Stage entry of International Application No. PCT/FR2011/052295, filed Oct. 3, 2011, which claims the benefit of priority to French Patent Application No. 10 58073, filed Oct. 5, 2010. The disclosures of the prior applications are hereby incorporated in their entirety by reference.

This invention relates to an agricultural spraying machine as well as a method for spraying a phytosanitary liquid on a cultivated land by means of such a machine.

It is known to use an agricultural machine provided with a spray boom in order to spread a phytosanitary liquid on vegetation planted on land that can comprise irregularities, for example holes or bumps, and of which the slope can vary.

In order for the distribution of the phytosanitary liquid on the vegetation to be satisfactory, the boom must not be too far from the vegetation, in such a way as to avoid the dispersion of drops of phytosanitary liquid into the atmosphere. Moreover, if the boom is too close to the land, it risks colliding with the land and/or the vegetation, which would damage the spray boom and which could plug up the spraying nozzles of the boom.

Traditionally, an agricultural spraying machine is provided with cylinders in order to incline and raise or lower its spray boom in relation to its frame, which allows the boom to adapt to the variations in the geometry of the land. The user, when the agricultural machine sprays the phytosanitary liquid on the vegetation, manually controls the elevation of the spray boom, i.e. its inclination, and the height of the spray boom, so that it is not too close or too far from the vegetation or the land.

However, when the user sprays the phytosanitary liquid on the vegetation, manually controlling the inclination and the height of the boom is not easy because the user must simultaneously control the machine, for example a tractor, along a trajectory. When the boom comprises several articulated arms, the controlling is even more difficult because the user manually controls the variable geometry of the boom, i.e. the inclination of the various arms. In addition, the user always aims to go as quickly as possible and cannot afford to reduce the speed of the machine.

According to another aspect, due to the inertia of the boom which remains tilted in order to not transfer the irregularities of the land under the wheels of the machine, each modification in the elevation of the boom, and where applicable in its variable geometry, results in a moving of the centre of gravity and a tipping of the boom beyond the angle corrected manually by the user. This causes oscillations, similar to those of a pendulum, which can thrust one of the ends of the boom into the land. These oscillations can, furthermore, complicate and slow down the correct adjustment of the correction for the elevation and/or the variable geometry of the boom. This disadvantage is also present in the known systems for automatic elevation correction, such as the one described in document DE-A.-41 40 254.

It is these disadvantages that the invention intends more particularly to overcome by proposing an agricultural spraying machine and a method for spraying allowing for easy and optimised spraying, and which limits the risks of collision between the boom and the land or between the boom and vegetation planted on the land.

To this effect, the invention relates to an agricultural machine for spraying an phytosanitary liquid on a cultivated land, comprising
  means for moving the machine over a surface of the land,
  a spray boom for spraying the phytosanitary liquid comprising at least one arm,
  a mechanism for inclining the boom and/or at least one of the arms in relation to a frame of the agricultural machine,
  a mechanism for raising/lowering the boom according to a fixed axis in relation to the frame of the agricultural machine and vertical, and even substantially vertical, when the agricultural machine is on a flat and horizontal surface and
  a control unit.

At least one of the arms of the boom is provided with at least one sensor, each sensor measuring a distance between the surface of the land and this sensor or, where applicable, between vegetation planted in the land and this sensor. The control unit is connected to each sensor, provided with a storage memory for the information provided by each sensor and able to control the mechanism for raising/lowering depending on the information stored in the memory.

Thanks to the invention, when a point of the spray boom is too close to the land or the vegetation, i.e. at a distance less than a predetermined minimum safety distance, the control unit controls the mechanism for raising/lowering so that it raises the boom automatically to a pre-programmed distance. Inversely, the control unit can also control the mechanism for raising/lowering so that it lowers the boom to a pre-programmed distance, when its point closest to the vegetation or the land is farther away from vegetation or the land than a pre-programmed maximum distance. This allows the user to manually control the inclination of each arm of the boom, while still ensuring that the point of the boom which is closest to the land or the vegetation is maintained automatically at a distance which is, on the one hand, at least equal to the minimum safety distance, which avoids the risks of collision between the boom and the land or the vegetation, and, on the other hand, less than the pre-programmed maximum distance, which avoids the dispersion of the phytosanitary liquid into the atmosphere.

According to advantageous but not mandatory aspects of the invention, such an agricultural machine can incorporate one or several of the following characteristics, taken in any combination technically permissible:
  It is provided with a manual control system for controlling the mechanism for raising/lowering and/or for controlling at least one mechanism for inclining.
  The control unit is able to control at least one mechanism for inclining depending on the information stored in the memory.
  At least one of the arms of the boom is provided with at least two sensors.

The invention also has for purpose a method for spraying a phytosanitary liquid on cultivated land, by means of a machine according to the invention. This method comprises steps wherein:
  a1) before the spraying, the user enters into the control unit the value of a minimum distance,
  b1) during the spraying, as soon as the distance measured by at least one sensor is less than the minimum distance predetermined in step a1), the control unit controls the mechanism for raising/lowering the boom in order to rapidly separate the boom from the surface until the distance measured by this or these sensors is equal to the minimum distance predetermined in step a1).

The invention also has for purpose a second method for spraying a phytosanitary liquid on cultivated land, by means of a machine according to the invention. This method comprises steps wherein:

a2) before the spraying, the user enters into the control unit the value of a minimum distance and the value of an intermediate distance greater than the minimum distance, b2) during the spraying, as soon as the distance measured by at least one sensor is less than the minimum distance predetermined in step a2), the control unit controls the mechanism for raising/lowering the boom in order to rapidly separate the boom from the surface until the distance measured by this or these sensors is equal to the intermediate distance predetermined in step a2).

The invention also has for purpose a third method for spraying a phytosanitary liquid on cultivated land, by means of a machine according to the invention. This method comprises steps wherein:

a3) before the spraying, the user enters into the control unit the value of a minimum distance, the value of a maximum distance and the value of an intermediate distance between the minimum distance and the maximum distance, b31) during the spraying, as soon as the distance measured by at least one sensor is less than the minimum distance predetermined in step a3), the control unit controls the mechanism for raising/lowering the boom in order to rapidly separate the boom from the surface until the distance measured by this or these sensors is equal to the intermediate distance predetermined in step a3), b32) during the spraying, as soon as the distance d measured by each sensor is greater than the maximum distance predetermined in step a3), the control unit controls the mechanism for raising/lowering the boom in order to bring the boom closer to the surface until the distance measured by at least one sensor is equal to the intermediate distance predetermined in step a3).

According to advantageous but not mandatory aspects of the invention, such methods can incorporate one or several of the following characteristics, taken in any combination technically permissible:

They include an additional step c1), after the steps a1), a2) and a3) and without priority in relation to steps b1), b2) and b31) wherein the user uses the system for manually controlling the mechanism for raising/lowering in order to separate the boom from or bring it closer to the surface and/or uses the system for manually controlling at least one mechanism for inclining in order to incline at least one of the arms.

They include an additional step c2), after the steps a 1), a2) and a3) and without priority in relation to steps b1), b2) and b31), wherein the control unit controls at least one mechanism for inclining in such a way that each arm associated with this or these inclination mechanisms is globally parallel to a portion of the surface located to the vertical of this arm.

The minimum distance is between 30 cm and 70 cm, preferably of a magnitude of 50 cm.

The maximum distance is between 70 cm and 150 cm, preferably of a magnitude of 100 cm.

The intermediate distance is between 50 cm and 100 cm, preferably of a magnitude of 70 cm.

The invention shall be better understood and other advantages of the latter shall appear more clearly when reading the following description of an agricultural spraying machine and of a method for spraying accordance with its principle, provided solely by way of example and in reference to the annexed drawings wherein:

FIG. 1 is a rear view of an agricultural machine according to the invention;

FIG. 2 is a perspective view that diagrammatically shows the machine of FIG. 1.

Figure 3:
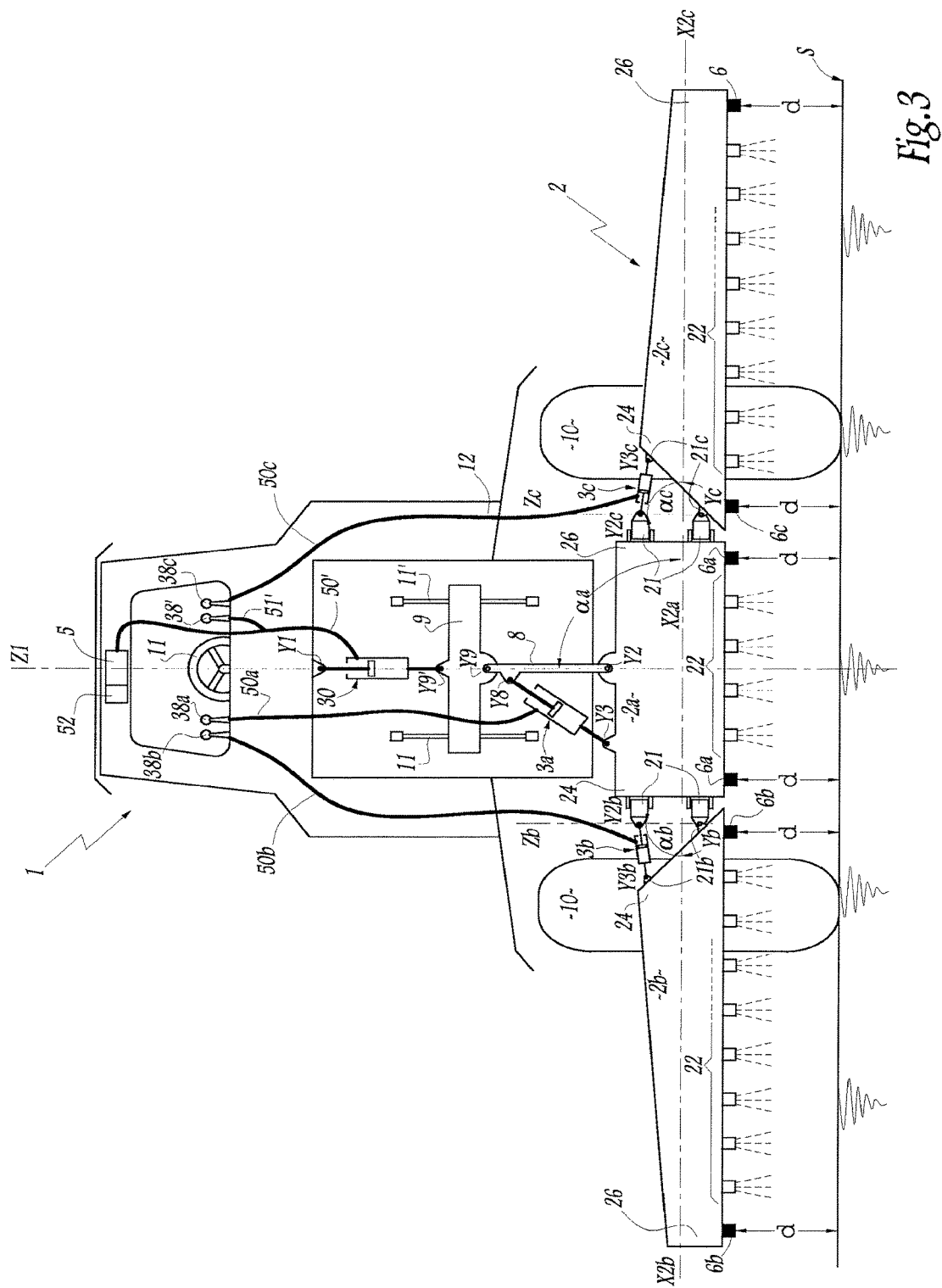
FIG. 3 is a view similar to FIG. 1 of an agricultural machine in accordance with a second embodiment of the invention.

FIG. 1 shows an agricultural machine 1 for spraying a phytosanitary liquid which is provided with a spray boom 2 located to the rear of the machine 1. Alternatively, the boom 2 is located in front of the machine 1. The machine 1 is also provided with a motor not shown which belongs to means for moving the machine 1 on land, with a transmission, a steering wheel 11 and wheels 10. The machine 1 is therefore self-propelled and autonomous, but alternatively the boom 2 is supported by a trailer hitched to any self-propelled machine. The machine 1 is a tractor, but other machines can be used.

As shown in FIG. 2, whereon the machine 1 is shown diagrammatically, X1 denotes a transversal axis of the machine 1, perpendicular to its forward motion in a straight line, Y1 a longitudinal axis of a frame 12 of the machine 1, parallel to its forward motion in a straight line, and Z1 an axis of the machine 1 perpendicular to the axes X1 and Y1. The axes X1, Y1 and Z1 are fixed in relation to the frame 12 of the machine 1.

In FIGS. 1 and 2, the machine 1 is on the surface S of a flat and horizontal land wherein vegetation, not shown, can be cultivated. The frame 12 of the machine 1 is therefore horizontal, and even slightly inclined upwards, and the axis Z1 is then vertical, and even slightly inclined to the side. The axis Z1 is therefore vertical or substantially vertical. However, when the inclination of the surface S varies, the axis Z1 is inclined in relation to the vertical.

In the rest of the description, the elements qualified as lower are closer to the surface S than the elements qualified as upper.

The boom 2 comprises a single arm 2a which extends along a longitudinal axis X2, substantially parallel to the axis X1 when the machine 1 is on flat and horizontal land. Means for spraying 22 are distributed on the boom 2, along the longitudinal axis X2, and project a phytosanitary liquid onto the surface S.

In an alternative not shown, the boom 2 can include several sections articulated together around axes parallel to the axis Z1, in such a way that it is possible to fold back the boom 2 in order to reduce its length, which is advantageous when the machine 1 is travelling on a narrow road.

The boom 2 is provided with two sensors 6, a first sensor 6 located on a first end 24 of the boom 2, and a second sensor 6 located on the other end 26 of the boom 2. Each sensor 6 makes it possible to measure a distance d between this sensor 6 and the surface S or, where applicable, between this sensor 6 and vegetation planted in the land. The sensors 6 and the means for spraying 22 are located substantially in the same plane perpendicular to the axis Z1. In FIG. 1, as the longitudinal axis X2 of the boom 2 is parallel to the surface S, the distances d measured by each sensor 6 are identical.

In an alternative not shown, the sensors 6 and the means for spraying 22 are located in a plane that is slightly inclined in relation to a plane perpendicular to the axis Z1. In addition, the sensors 6 can be offset according to the axis Z1 in relation to the means for spraying 22. In this case, the control unit 5 is informed of this offset.

A connecting rod 8, parallel to the axis Z1 in the configuration of FIG. 1, is articulated in rotation, on its lower end, with the boom 2, around an axis Y2 parallel to the axis Y1. The upper end of the connecting rod 8 is articulated in rotation, around an axis Y9 parallel to the axis Y1, with a slideway 9. The slideway 9 is mobile in translation according to the axis Z1 in relation to the frame 12 of the machine 1. To do this, the slideway 9 cooperates with two rails 11 and 11' parallel to the axis Z1 and which are fixed to the frame 12. The rails 11 and 11' are located on either side of the axis Z1.

The machine 1 is provided with a mechanism for inclining the boom 2 in a plane X1-Z1 perpendicular to the forward direction Y1 of the machine 1. The plane X1-Z1 is parallel to the axes X1 and Z1. The mechanism for inclining allows for the inclination of the boom 2 in relation to the frame 12 of the machine 1 and comprises a first cylinder 3 which can be hydraulic or electrical, but other actuators can be suitable.

The first cylinder 3 comprises a rod 32 and a body 34. The rod 32 comprises an upper end, located opposite the body 34, articulated in rotation with the connecting rod 8 around an axis Y8 parallel to the axis Y1 and located in the vicinity of the axis Y9. The body 34 of the first cylinder 3 is connected to the boom 2 by a bar 36. A lower end of the bar 36, opposite the body 34 of the cylinder 3, is articulated in rotation with the boom 2 around an axis Y3 parallel to the axis Y1. The axis Y3 is offset along the longitudinal axis X2 of the boom 2 in relation to the axis Y2. The cylinder 3 therefore allows for the inclination of the boom 2 around the axis Y2.

The machine 1 is also provided with a mechanism for raising/lowering the boom 2 according to the axis Z1. The mechanism for raising/lowering comprises a second cylinder 30 which can be hydraulic or electrical, but other actuators can be suitable.

The second cylinder 30 comprises a rod 32' and a body 34'. The rod 32' comprises an upper end which is located opposite the body 34' of the cylinder 30 and which is articulated in rotation with the machine 1 around the axis Y1.

The body 34' of the second cylinder 30 is connected to the slideway 9 by a bar 36'. A lower end of the bar 36', opposite the body 34' of the second cylinder 30, is articulated in rotation with the slideway 9 around an axis Y9' parallel to the axis Y1. The axes Y1, Y2, Y9 and Y9' are aligned along the axis Z1.

α denotes an angle defined between the axis Z1 and the longitudinal axis X2 of the boom 2 in a plane perpendicular to the axis Y1. The angle α is located, in FIG. 1, in the upper right quadrant. In the configuration of FIG. 1, the angle α is equal to 90°.

The translation of the rod 32' of the second cylinder 30 causes the translation of the boom 2 according to the axis Z1, by the intermediary of the connecting rod 8 and of the slideway 9, which moves closer or separates the boom 2 from the surface S.

The translation of the rod 32 of the first cylinder 3 causes the inclination of the longitudinal axis X2 of the boom 2 in relation to the axis Z1, i.e. the variation of the angle α. In other words, the first cylinder 3 allows for the rotation of the boom 2 in the plane X1-Z1, around the axis Y2.

The machine 1 is provided with a control unit 5 which includes a memory 52 for storing information.

The sensors 6 are connected to the control unit 5 by wired connections not shown which allow the sensors 6 to transmit to the control unit 5 information concerning the values that they are measuring. Alternatively, the means of connecting between the sensors 6 and the control unit 5 are wireless.

The machine 1 is provided with an optional manual system for controlling the first cylinder 3. The manual control system comprises, for example, a first controller 38 placed in the cabin of the machine 1 in the vicinity of the steering wheel 11. The first controller 38 is connected to the first cylinder 3 by a first wired connection 51.

The manual system for controlling the first cylinder 3 allows the user to vary the angle α, i.e. to vary the inclination of the boom 2 in the plane X1-Z1 in relation to the axis Z1, with the purpose of making it parallel to the surface S.

In addition, the first cylinder 3 is, optionally, connected to the control unit 5 by a wired connection 50 which makes it possible for the control unit 5 to control the first cylinder 3.

In such a way as to ensure its controlling, the first cylinder 3 is connected to the control unit 5 and/or to the controller 38.

The second cylinder 30 is connected to the control unit 5 by a wired connection 50' which allows the control unit 5 to control the second cylinder 30.

The machine 1 is also provided with an optional manual system for controlling the second cylinder 30. This manual control system comprises, for example, a second controller 38' placed in the cabin of the machine 1 in the vicinity of the steering wheel 11. The second controller 38' is connected to the second cylinder 30 by a wired connection 51'.

Alternatively, the wired connections 50, 50', 51 and 51' are wireless.

The cabin of the machine 1 is configured in such a way that the user can simultaneously control the means for moving the machine 1, with the steering wheel 11, and the manual systems for controlling the first cylinder 3 and the second cylinder 30, i.e. the controllers 38 and 38'.

The rest of the description relates to a first method for spraying a phytosanitary liquid on vegetation planted in the land, by means of the machine 1.

Before the spraying and in a step a1), the user enters into the control unit 5 the value of a minimum distance $d_{min}$. The minimum distance $d_{min}$ can be between 30 cm and 70 cm, preferably of a magnitude of 50 cm.

During the spraying and in a step b1), following step a1), as soon as the distance d measured by at least one sensor 6 is less than the minimum distance $d_{min}$ predetermined in step a1), the control unit 5 rapidly and automatically controls the second cylinder 30 in order to separate the boom 2 from the surface S until the distance d measured by this or these sensors 6 is equal to the minimum distance $d_{min}$ predetermined in step a1). The rapid controlling of the raising of the boom 2 makes it possible to prevent the risks of collision between the boom 2 and the land or the vegetation. For example, the control unit 5 can control the second cylinder 30 in such a way that the translation time of the rod 32' of the second cylinder 30 is of a magnitude of a few seconds.

As such, as soon as the boom 2 is too close to the surface S, it is automatically raised. This makes it possible to prevent the boom 2 from entering into collision with the land or, where applicable, with the vegetation planted in the land. In this way, the boom 2 and the means for spraying 22 do not risk becoming damaged. Moreover, this allows the user to more serenely control the trajectory of the machine 1 while still manually controlling the first cylinder 3 easily, without having to provide excessive vigilance as to the risks of collision.

The rest of the description relates to a second method for spraying a phytosanitary liquid on vegetation planted in the land, by means of the machine 1.

In a step a2) and before the spraying, the user enters into the control unit 5 the value of a minimum distance $d_{min}$ and the value of an intermediate distance $d_{int}$ greater than the minimum distance $d_{min}$.

The intermediate distance $d_{int}$ can be between 50 cm and 100 cm, preferably of a magnitude of 70 cm.

Then, during the spraying and in a step b2), as soon as the distance d measured by at least one sensor 6 is less than the minimum distance $d_{min}$ predetermined in step a2), the control unit 5 controls the second cylinder 30 in order to rapidly and automatically separate the boom 2 from the surface S until the distance d measured by this or these sensors 6 is equal to the intermediate distance $d_{int}$ predetermined in step a2).

For example, the control unit 5 can control the second cylinder 30 in such a way that the translation time of the rod 32' of the second cylinder 30 is of a magnitude of a few seconds.

In this way, as soon as the boom 2 is too close to the surface S, the control unit controls the second cylinder 30 in such a way as to advantageously position the boom 2 at the intermediate distance $d_{int}$, which corresponds to a satisfactory spraying distance.

The rest of the description relates to a third method for spraying a phytosanitary liquid by means of the machine 1.

In a step a3) and before the spraying, the user enters into the control unit 5 the value of a minimum distance $d_{min}$, the value of a maximum distance $d_{max}$ and the value of an intermediate distance $d_{int}$ between the minimum distance $d_{min}$ and the maximum distance $d_{max}$.

The maximum distance $d_{max}$ can be between 70 cm and 150 cm, preferably of a magnitude of 100 cm.

Then, during the spraying and in a step b31) after the step a3), as soon as the distance d measured by at least one sensor 6 is less than the minimum distance $d_{min}$ predetermined in step a3), the control unit 5 automatically and rapidly controls the second cylinder 30 in order to separate the boom 2 from the surface S until the distance d measured by this or these sensors 6 is equal to the intermediate distance $d_{int}$ predetermined in step a3). For example, the control unit 5 can control the second cylinder 30 in such a way that the translation time of the rod 32' of the second cylinder 30 is of a magnitude of a few seconds.

As such, as soon as the boom 2 is too close to the surface S or to the vegetation, the control unit 5 automatically separates the boom 2 into an intermediate position for optimum spraying.

During the spraying and in a step b32) after the step a3), as soon as the distance d measured by each sensor 6 is greater than the maximum distance $d_{max}$ predetermined in step a3), the control unit 5 automatically controls the second cylinder 30 in order to bring the boom 2 closer to the surface S, until the distance d, measured by at least one of the sensors 6, is equal to the intermediate distance $d_{int}$, predetermined in step a3).

As such, as soon as the boom 2 is too far from the surface S or from the vegetation, the control unit 5 automatically brings the boom 2 closer into an intermediate position for optimum spraying.

The steps b1), b2) and b31) have priority in relation to the optional steps described hereinbelow because the steps b1), b2) and b31) make it possible to prevent the collision of the boom 2 with the land or the vegetation, which is essential.

In a step c1) which is optional, which can be implemented for the first, second and third methods described hereinabove, and which is after the steps a1), a2) and a3), the user uses the manual control system 38' of the second cylinder 30 in order to bring the boom 2 closer to the surface S. In this case, once the risks of collision have been avoided, i.e. once the control unit 5 has automatically controlled the mechanism for raising/lowering 30 during the step b1), b2) or b31), the user at his discretion brings the boom 2 closer to the surface S.

Inversely, in the step c1) the user can also user the manual control system 38' of the second cylinder 30 in order to separate the boom 2 from the surface S or the vegetation, for example if he anticipates an imminent risk of collision.

The step c1) does not have priority in relation to the steps b1), b2) and b31), i.e. the user cannot use the manual control system 38' of the second cylinder 30 to position the boom 2 at a distance d less than $d_{min}$. As the steps $b_1$), b2) and b31) have priority before the step c1), as soon as the distance d measured by at least one sensor 6 is less than $d_{min}$, the control unit 5, in the step b1), b2) or b31), separates the boom 2 from the surface S or from the vegetation so that the distance d measured by the sensor 6 is, according to the method, greater than or equal to $d_{min}$.

Moreover, insofar as the distance d measured by each sensor 6 remains greater than or equal to the minimum distance $d_{min}$, the manual control of the mechanism for inclining 3 and of the mechanism for raising/lowering 30, decided by the user, takes effect immediately and has priority before the actions controlled by the control unit 5 other than the actions of the steps b1), b2) and b31). Indeed, the steps b1), b2) and b31) make it possible to prevent the thrusting of the boom 2 into the land or the vegetation, which is essential.

In a step c2) which is optional, which can be implemented in the first, second and third methods described hereinabove and which is after the steps a1), a2) and a3), the control unit 5 controls the first cylinder 3 in such a way as to position the boom 2 globally parallel to a portion of the surface S located to the vertical of the boom 2. For example, the control unit can control the first cylinder 3 in such a way that the distances d measured by each sensor 6 are globally equal. The step c2) does not have priority before the steps b1), b2) and b31), i.e. in the step c2), when the control unit 5 controls the first cylinder 3, it cannot position the boom 2 at a distance d less than or equal to $d_{min}$.

Advantageously, in the step c2), the control unit 5 controls the first cylinder 3 in such a way that the distance d measured by a minimum of sensors 6 is greater than the maximum distance $d_{max}$.

FIG. 3 corresponds to a second embodiment of the invention wherein the machine 1 is provided with a spraying boom 2 which comprises three articulated arms 2a, 2b and 2c. In FIG. 3, the elements similar to those of FIG. 1 bear the same reference numbers to which is possibly added either the letter "a", in the case where the element relates to the arm 2a, or the letter "b", in the case where the element relates to the arm 2b, or the letter "c" in the case where the element relates to the arm 2c.

The arm 2a is centred on the axis Z1 and is located between the first arm 2b and the second arm 2c. The arm 2a constitutes a "central frame" for the boom 2.

X2a denotes a longitudinal axis of the central frame 2a, X2b a longitudinal axis of the first arm 2b and X2c a longitudinal axis of the second arm 2c.

The central frame 2a of the boom 2 is connected to the machine 1 by a structure similar to that described in reference to the first embodiment. This structure comprises a first cylinder 3a, which corresponds to the cylinder 3 of FIG. 1, as well as a connecting rod 8, a slideway 9, two rails 11 and 11' and a second cylinder 30, analogous to the elements bearing the same references in FIG. 1.

αa denotes an angle located on the side of the second arm 2c in relation to the axis Z1 and defined in a plane X2a-Z1, between the axes X2a and Z1. In FIG. 1, the angle αa is located in the upper right quadrant. The plane X2a-Z1 passes through the axes X2a and Z1 and is perpendicular to the forward direction Y1 of the machine 1.

The first arm 2b is articulated in rotation with a first axial end 24 of the central frame 2a around an axis Yb parallel to the axis Y1. To do this, the central frame 2a is provided with an element 21 that cooperates with an element 21b, fixed on a first end 24 of the first arm 2b, in order to form the articulation. The machine 1 is provided with a cylinder 3b of which a first end is articulated in rotation, around an axis Y3b, with the arm 2b and of which a second end is articulated in rotation, around an axis Y2b, with the central frame 2a. The axes Y2b and Y3b are parallel to the axis Y1.

Zb denotes a first reference axis, fixed in relation to the frame 12 of the machine 1, parallel to the axis Z1. In FIG. 3, the axis Zb is confounded with the axes Yb and Y2b. However, when the boom 2 is inclined, the axis Zb no longer passes through the axes Yb and Y2b.

The second arm 2c is articulated in rotation with a second axial end 26 of the central frame 2a around an axis Yc parallel to the axis Y1. To do this, the central frame 2a is provided with an additional element 21 that cooperates with an element 21c, fixed on a first end 24 of the second arm 2c, in order to form the articulation. The machine 1 is provided with an additional cylinder 3c of which a first end is articulated in rotation, around an axis Y3c, with the arm 2c and of which a second end is articulated in rotation, around an axis Y2c, with the central frame 2a.

Zc denotes a second reference axis, fixed in relation to the frame 12 of the machine 1, parallel to the axis Z1. In FIG. 3, the axis Zc is confounded with the axes Yc and Y2c. However, when the boom 2 is inclined, the axis Zc no longer passes through the axes Yc and Y2c.

The translation of the rod of the cylinder 3b or 3c causes the inclination of the arm 2b or 2c in the plane X2a-Z1, around the axis Yb or Yc, in relation to the reference axis Zb or Zc and therefore in relation to the axis Z1. The cylinders 3a, 3b and 3c therefore make it possible to incline the arms 2a, 2b and 2c in relation to the frame 12 of the machine 1.

αb denotes an angle located on the side of the arm 2b in relation to the axis Zb and defined in the plane X2a-Z1, between the axes Zb and X2b. αc denotes an angle located on the side of the arm 2c in relation to the axis Zc and defined between the axes Zc and X2c. In the configuration of FIG. 3, the angles αa, αb and αc are equal to 90°. The angles αb and αc correspond to the inclination of the arms 2b and 2c in the plane X2a-Z1, in relation to the axis Z1.

Each arm 2a, 2b and 2c is provided with two sensors 6a, 6b or 6c which are located on each axial end 24 and 26 of the arms 2a, 2b or 2c and which each measure their own distance d, as shown in FIG. 3.

The machine 1 is provided with a manual system for controlling cylinders 3a, 3b and 3c which allows the user to separately control the cylinders 3a, 3b and 3c. This manual control system comprises a first controller 38a, a second controller 38b and a third controller 38c. The first controller 38a is connected to the cylinder 3a by a wired connection 50a which allows the user to manually control the inclination of the central frame 2a, i.e. to vary the angle αa. The second controller 38b is connected to the cylinder 3b by a wired connection 50b which allows the user to manually control the inclination of the arm 2b, i.e. to vary the angle αb.

The third controller 38c is connected to the cylinder 3c by a wired connection 50c which allows the user to manually control the inclination of the arm 2c, i.e. to vary the angle αc.

The machine 1 is provided with a manual control system 38' of the cylinder 30 which comprises a controller 38' connected to the cylinder 30 by a wired connection 51'.

The wired connections 50a, 50b, 50c and 51' can be wireless.

The machine 1 is provided with a control unit 5 which comprises a memory 52 and which is connected to the cylinder 30 by a wired connection 50'. Each sensor 6a, 6b and 6c is connected to the control unit 5 by wired connections not shown. These connections can also be wireless.

The method of spraying a phytosanitary liquid by means of the machine 1 in accordance with the second embodiment is similar to the method described in reference to the first embodiment. However, during the steps b1, b2), b31) b32) and c2), the sensors 6a, 6b and 6c of each arm 2a, 2b and 2c are taken into account.

In particular, during the steps b1, b2), b31), b32) and c2), the control unit 5 controls the mechanism for raising/lowering 30 according to the distances measured by each sensor 6a, 6b and 6c.

During the step c1), the user can use the manual control system 38' of the cylinder 30 insofar as the distance d measured by each sensor 6a, 6b and 6c is greater than or equal to the distance $d_{min}$.

During the step c2), the control unit 5 controls at least one cylinder 3a, 3b or 3c in such a way that the arm 2a, 2b or 2c associated to the cylinder 3a, 3b or 3c is globally parallel to a portion of the surface S located to the vertical of the arm 2a, 2b or 2c, insofar as the distance d measured by each sensor 6a, 6b and 6c is greater than or equal to the distance $d_{min}$. For example, the control unit 5 can control the cylinder 3b and the cylinder 3c in such a way that the arms 2b and 2c are globally parallel to portions of the surface S located to the vertical of the arms 2b and 2c, insofar as the distances d measured by the sensors 6b and 6c are greater than or equal to the distance $d_{min}$.

In other embodiments of the invention, not shown, the number and the location of the sensors 6, 6a, 6b and 6c on the boom 2 can vary. For example, in the case of a machine 1 of which the boom 2 comprises a central frame 2a and two arms 2b and 2c located on either side of the central frame 2a, as shown in FIG. 3, the central frame 2a can comprise only one central sensor 6a, and the arms 2b and 2c can each comprise only one end sensor 6b or 6c, located opposite the central frame 2a.

Moreover, the boom 2 can comprise a variable number of arms. For example, on each side of the central frame 2a, the boom 2 can comprise two arms articulated together.

On the other hand, the mechanisms for inclination, raising/lowering and the system for hooking the boom 2 to the frame 12 of the machine 1 show are not restrictive, as the invention can be implemented for machines that are different from the tractors shown in the figures. For example, the mechanism for raising/lowering can be of the deformable double parallelogram type.

The manual control systems 38, 38a, 38b and 38c inclination mechanisms 3, 3a, 3b and 3c are optional, given that the control unit 5 is able to control the inclination mechanisms 3, 3a, 3b and 3c. As such, in an embodiment of the invention, the control unit 5 controls both the mechanism for raising/lowering 3 and each mechanism for inclining 30, without the user manually controlling these mechanisms 3 and 30.

Furthermore, the embodiments shown are not restrictive and their characteristics can be combined.

The invention claimed is:

1. Method for spraying phytosanitary liquid on cultivated land by means of an agricultural machine, said machine being movable on a surface of the cultivated land and comprising:
   at least one spray arm for spraying a phytosanitary liquid onto the surface or onto vegetation planted thereon,
   at least one inclining actuator for inclining the arm relative to a frame of the machine,
   at least one raising/lowering actuator for raising/lowering the arm in translation relative to the frame,
   at least one sensor provided on the arm for measuring a sensor distance value between said sensor and the surface or vegetation planted thereon,
   a control unit, configured to automatically control the inclining actuator and the raising/lowering actuator during the spraying, depending on the sensor distance value, a user-configurable minimum distance value, and a user-configurable intermediate distance value greater than the user-configurable minimum distance value,
   wherein the method comprises the following steps:
   b2) during the spraying, as soon as the sensor distance value measured by the sensor is less than the user-configurable minimum distance value, the control unit controls the raising/lowering actuator in order to separate the arm from the surface or from vegetation planted thereon, until the sensor distance value measured by said sensor is equal to the user-configurable intermediate distance value, and
   c2) during the spraying, without priority in relation to b2), the control unit controls the inclining actuator in such a way that the arm is approximately parallel to the surface.

2. Method for spraying according to claim 1, wherein the method comprises a step a2) as follows: before the spraying, a user configures the minimum distance value and the intermediate distance value into the control unit.

3. Method for spraying according to claim 2, wherein the user-configurable minimum distance value is between 30 cm and 70 cm and wherein the user-configurable intermediate distance value is between 50 cm and 100 cm.

4. Method for spraying according to claim 1, wherein:
   the control unit is configured to automatically control the inclining actuator and the raising/lowering actuator during the spraying, depending on a user-configurable maximum distance value,
   wherein the method comprises a further step b32), as follows: during the spraying, as soon as the sensor distance value measured by the sensor is greater than the user-configurable maximum distance value, the control unit controls the raising/lowering actuator in order to bring the arm closer to the surface, until the sensor distance value measured by said sensor is equal to the user-configurable intermediate distance value, and
   step c2) is performed without priority in relation to step b32).

5. Method for spraying according to claim 4, wherein the method comprises a further step a3) as follows: before the spraying, a user configures the maximum distance value into the control unit.

6. Method for spraying according to claim 5, wherein the user-configurable maximum distance value is between 70 cm and 150 cm.

7. Method for spraying according to claim 1, wherein the machine further comprises a manual control system for controlling the raising/lowering actuator and the inclining actuator, and wherein the method includes a further step c1), without priority to step b2), wherein a user uses the manual control system in order to separate or bring the arm closer to the surface by means of the raising/lowering actuator and/or in order to incline the arm by means of the inclining actuator.

8. Method for spraying according to claim 1, wherein the machine is provided only with one single arm forming a spray boom of the machine.

9. Method for spraying according to claim 1, wherein:
   the machine is provided with several arms forming a spray boom of the machine, one of the arms forming a central frame of the boom and the other arms being articulated arms relative to the central frame,
   the raising/lowering actuator is configured for raising/lowering said arms by raising/lowering the central frame of the boom in translation relative to the frame of the machine, and
   the machine is provided with several inclining actuators configured for inclining each of the articulated arms relative to the central frame and configured for inclining the boom relative to the frame of the machine by means of the central frame.

10. Agricultural machine, said machine being movable on a surface of a cultivated land, the machine comprising:
    at least one spray arm for spraying a phytosanitary liquid onto the surface or onto vegetation planted thereon,
    at least one inclining actuator for inclining the arm relative to a frame of the machine,
    at least one raising/lowering actuator for raising/lowering the arm in translation relative to the frame,
    at least one sensor provided on the arm for measuring a sensor distance value between said sensor and the surface or vegetation planted thereon,
    a control unit, configured to automatically control the inclining actuator and the raising/lowering actuator during the spraying, depending on the sensor distance value, a user-configurable minimum distance value, and a user-configurable intermediate distance value greater than the user-configurable minimum distance value,
    wherein the control unit is configured so that:
    b2) during the spraying, as soon as the sensor distance value measured by the sensor is less than the user-configurable minimum distance value, the control unit controls the raising/lowering actuator in order to separate the arm from the surface or from vegetation planted thereon, until the sensor distance value measured by said sensor is equal to the user-configurable intermediate distance value, and
    c2) without priority in relation to b2), the control unit controls the inclining actuator in such a way that the arm is globally parallel to the surface.

11. Agricultural machine according to claim 10, wherein the control unit is further configured so that: a2) before the spraying, a user may configure the minimum distance value and the intermediate distance value into the control unit.

12. Agricultural machine according to claim 11, wherein the user-configurable minimum distance value is between 30 cm and 70 cm and wherein the user-configurable intermediate distance value is between 50 cm and 100 cm.

13. Agricultural machine according to claim 10, wherein:
the control unit is configured to automatically control the inclining actuator and the raising/lowering actuator during the spraying, depending on a user-configurable maximum distance value,
wherein the control unit is configured so that: b32) during the spraying, as soon as the sensor distance value measured by the sensor is greater than the user-configurable maximum distance value, the control unit controls the raising/lowering actuator in order to bring the arm closer to the surface, until the sensor distance value measured by said sensor is equal to the user-configurable intermediate distance value, and
the control unit is configured to perform step c2) without priority in relation to step b32).

14. Agricultural machine according to claim 13, wherein the control unit is configured so that: a3) before the spraying, a user may configure the maximum distance value into the control unit.

15. Agricultural machine according to claim 14, wherein the user-configurable maximum distance value is between 70 cm and 150 cm.

16. Agricultural machine according to claim 10, wherein the machine further comprises a manual control system for controlling the raising/lowering actuator and the inclining actuator, and wherein the manual control system is configured so that: c1) without priority to step b2), a user may use the manual control system in order to separate or bring the arm closer to the surface by means of the raising/lowering actuator and/or in order to incline the arm by means of the inclining actuator.

17. Agricultural machine according to claim 10, wherein the machine is provided only with one single arm forming a spray boom of the machine.

18. Agricultural machine according to claim 10, wherein:
the machine is provided with several arms forming a spray boom of the machine, one of the arms forming a central frame of the boom and the other arms being articulated arms relative to the central frame,
the raising/lowering actuator is configured for raising/lowering said arms by raising/lowering the central frame of the boom in translation relative to the frame of the machine, and
the machine is provided with several inclining actuators configured for inclining each of the articulated arms relative to the central frame and configured for inclining the boom relative to the frame of the machine by means of the central frame.

* * * * *